(12) United States Patent
Kenworthy

(10) Patent No.: US 10,378,175 B2
(45) Date of Patent: Aug. 13, 2019

(54) GRABBING ATTACHMENTS FOR HEAVY MACHINERY

(71) Applicant: Keith Kenworthy, Granite Falls, WA (US)

(72) Inventor: Keith Kenworthy, Granite Falls, WA (US)

( * ) Notice: Subject to any disclaimer, the term of this patent is extended or adjusted under 35 U.S.C. 154(b) by 29 days.

(21) Appl. No.: 15/793,662

(22) Filed: Oct. 25, 2017

(65) Prior Publication Data

US 2018/0216311 A1 Aug. 2, 2018

Related U.S. Application Data

(60) Provisional application No. 62/452,919, filed on Jan. 31, 2017.

(51) Int. Cl.
| | |
|---|---|
| *E02F 3/413* | (2006.01) |
| *B66F 9/075* | (2006.01) |
| *E02F 3/352* | (2006.01) |
| *E02F 3/627* | (2006.01) |
| *E02F 3/14* | (2006.01) |
| *B66C 1/12* | (2006.01) |
| *B66F 9/18* | (2006.01) |
| *F16G 11/09* | (2006.01) |
| *F16G 11/04* | (2006.01) |

(52) U.S. Cl.
CPC ............ *E02F 3/4133* (2013.01); *B66C 1/12* (2013.01); *B66F 9/07545* (2013.01); *B66F 9/18* (2013.01); *E02F 3/141* (2013.01); *E02F 3/352* (2013.01); *E02F 3/627* (2013.01); *F16G 11/046* (2013.01); *F16G 11/09* (2013.01)

(58) Field of Classification Search
CPC ............... E02F 3/4133; A01D 87/0076; A01D 87/0061; A01D 87/0069
USPC ........................................................ 414/24.5
See application file for complete search history.

(56) References Cited

U.S. PATENT DOCUMENTS

| | | | | |
|---|---|---|---|---|
| 2,418,403 A | * | 4/1947 | Grabske ................ | E02F 3/3414 414/717 |
| 2,927,815 A | * | 3/1960 | Flatau .................. | A01D 87/126 294/67.41 |
| 4,200,423 A | * | 4/1980 | Sornsin .................. | B66C 23/44 37/403 |

* cited by examiner

*Primary Examiner* — Ronald P Jarrett
(74) *Attorney, Agent, or Firm* — Mohr Intellectual Property Law Solutions, PC

(57) ABSTRACT

In one embodiment, a tractor bucket attachment may include an attachment head and a loop of flexible cable. The attachment head may include a mounting bracket and first and second cable attachment mechanisms. The mounting bracket may be configured to secure the attachment head to a tractor bucket, the tractor bucket having a front edge. The loop of flexible cable may have a first end and a second end, the first end being attached to the first cable attachment mechanism and the second end being attached to the second cable attachment mechanism. The loop of flexible cable may be configured to ensnare a bale against the front edge of the tractor bucket.

8 Claims, 7 Drawing Sheets

GRABBING ATTACHMENTS FOR HEAVY MACHINERY

CROSS REFERENCE TO RELATED APPLICATIONS

This application claims priority to U.S. Application Ser. No. 62/452,919, filed on Jan. 31, 2017, which is hereby incorporated by reference for all purposes.

BACKGROUND

The present disclosure relates generally to heavy machinery implements. In particular, grabbing attachments for tractors, front end loaders, backhoes and the like are described.

Heavy machinery is an important way for people to move large, heavy objects. Such objects include large, bundles of commodities such as bay, cotton, corn, wheat, etc. Other such large objects include boulders, large pieces of wood, etc. Grabbing attachments for heavy machinery may facilitate the often difficult and delicate task of moving such large objects.

Known grabbing attachments for heavy machinery are not entirely satisfactory for the range of applications in which they are employed. For example, existing grabbing attachments may require significant additional mechanical complexity, including hydraulic connections and a plethora of moving parts. In addition, conventional grabbing attachments may be prohibitively expensive for some uses and/or users.

Thus, there exists a need for grabbing attachments that improve upon and advance the design of known grabbing attachments for heavy equipment. Examples of new and useful grabbing attachments relevant to the needs existing in the field are discussed below.

SUMMARY

In one embodiment, a tractor bucket attachment may include an attachment head and a loop of flexible cable. The attachment head may include a mounting bracket and first and second cable attachment mechanisms. The mounting bracket may be configured to secure the attachment head to a tractor bucket, the tractor bucket having a front edge. The loop of flexible cable may have a first end and a second end, the first end being attached to the first cable attachment mechanism and the second end being attached to the second cable attachment mechanism. The loop of flexible cable may be configured to ensnare a bale against the front edge of the tractor bucket.

In some embodiments, the attachment head may comprise first and second guide arms, the guide arms being attached to the attachment head via first and second pivots, wherein the guide arms are configured to support the flexible cable proximal the first and second ends. In some embodiments, the first and second guide arms are configured to rotate horizontally about the first and second pivots, respectively.

In some embodiments, the guide arms comprise tubular members, the flexible cable being routed through the tubular members. In some embodiments, the tractor bucket attachment of claim 1, comprising a cable sheath surrounding at least a portion of the cable.

In some embodiments, the mounting bracket may comprise a sleeve configured to be attached to the tractor bucket; and a shaft secured to the attachment head, the shaft being configured to slide into the sleeve. In some embodiments, the tractor bucket attachment may comprise a mounting pin configured to secure the shaft within the sleeve. In some embodiments, the tractor bucket attachment may comprise a guard configured to protect the bale from the front edge of the tractor bucket.

In some embodiments, the first attachment mechanism comprises a hole in the attachment head and a corresponding attachment pin. In some embodiments, the first attachment mechanism comprises a set of holes in the attachment head and a corresponding attachment pin, the set of holes configured to facilitate length adjustment of the loop of cable.

In another embodiment, a tractor bucket attachment may comprise a first attachment head, a second attachment head, and a loop of flexible cable. The first attachment head may include a first mounting bracket configured to secure the attachment head to a tractor bucket, the tractor bucket having a front edge, and a first cable attachment mechanism. The second attachment head may include a second mounting bracket configured to secure the attachment head to the tractor bucket and a second cable attachment mechanism. The loop of flexible cable may have a first end and a second end, the first end being attached to the first cable attachment mechanism and the second end being attached to the second cable attachment mechanism. The loop of flexible cable may be configured to ensnare a bale against the front edge of the tractor bucket.

In some embodiments, the tractor bucket, attachment may include a first guide arm attached to the first attachment head via a first pivot, and a second guide arm attached to the second attachment head via a second pivot, wherein the guide arms are configured to support the flexible cable proximal the first and second ends. In some embodiments, the first and second guide arms are configured to rotate vertically about the first and second pivots, respectively.

In some embodiments, the guide arms comprise tubular members, the flexible cable being routed through the tubular members. In some embodiments, she tractor bucket attachment may comprise a cable sheath surrounding at least a portion of the cable. In some embodiments, the first mounting bracket may comprise a channel configured to be attached to the tractor bucket.

In some embodiments, the tractor bucket attachment comprises a guard configured to protect the bale from the front edge of the tractor bucket. In some embodiments, the first pivot comprises a pivot member, a pair of opposing holes in the mounting bracket and a pair of corresponding holes in the guide arm. In some embodiments, the pair of corresponding holes in the guide arm is one a plurality of pairs of holes in the guide arm, the plurality of pairs of holes being configured to facilitate length adjustment of the loop of cable.

DETAILED DESCRIPTION

The disclosed grabbing attachments will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, a variety of grabbing attachments examples are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1:
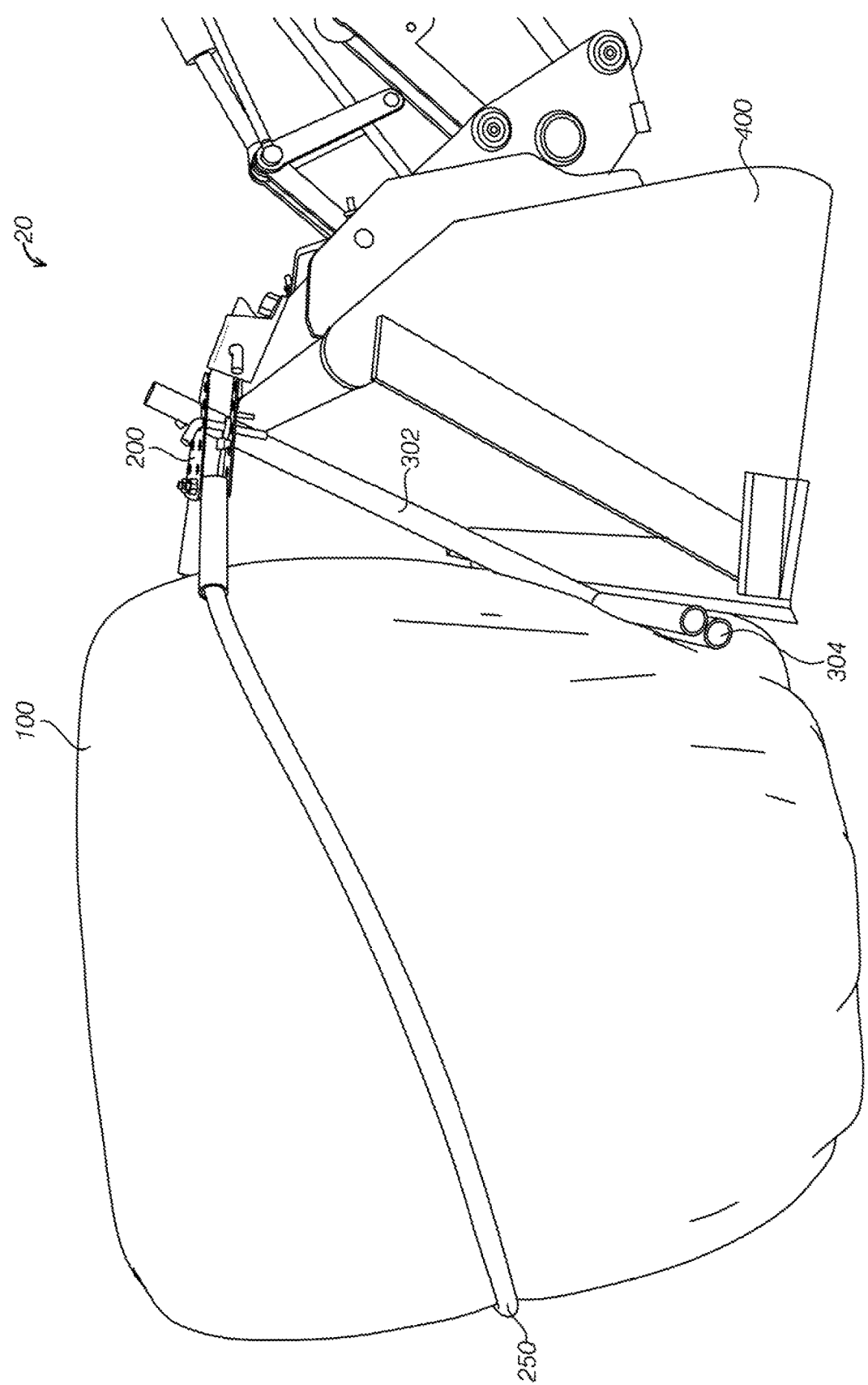
FIG. 1 is a perspective view of a first example of a grabbing attachment.

With reference to FIG. 1 a first example of a grabbing attachment, attachment 20, will now be described. Attachment 20 functions to grasp large heavy objects such as round bales of farm commodities (e.g., hay). Attachment 20 can also be used to grasp other large objects such as boulders.

Attachment 20 addresses many of the shortcomings existing with conventional grabbing attachments for heavy machinery. For example, attachment 20 does not require additional hydraulic machinery. Furthermore, attachment 20 may be significantly less expensive than existing grabbing attachments.

As shown in FIG. 1, grabbing attachment 20 includes an attachment head 200, guard 304, and loop 250. As can be seen, loop 250 wraps around bale 100. Loop 250 functions to grasp the sidewall of bale 100 via friction. The lower edge of tractor bucket 400 exerts pressure on the opposite sidewall of bale 100.

Guard 304 is disposed between the bale 100 and the lower edge of tractor bucket 400. Guard 304 functions to protect the bale 100 from being impaled or torn by the potentially sharp lower edge of tractor bucket 400. Thus, the bale 100 is held, via friction by loop 250 and guard 304.

Guard 304 is connected to attachment head 200 via leg 302. Guard 304 may be a variety of shapes, so long as the guard functions to protect the bale 100 from the sharp lower edge of the tractor bucket 400. In one embodiment, guard 304 may be round or have a round or curved edge. In another embodiment, guard 304 may be a flat or essentially flat plate.

In one embodiment, guard 304 and leg 302 may be comprised of metal. For example, guard 304 and leg 203 may be comprised of steel tubing. In one embodiment, guard 304 may be comprised of round tubing. For example, in the illustrated embodiment, guard 304 is comprised of two lengths of round cubing disposed side by side. In other embodiments, guard 304 may be comprised of square tubing.

In one embodiment, leg 302 may be comprised of round tubing. For example, in the illustrated embodiment leg 302 is comprised of two lengths of round tubing disposed side by side. In other embodiments, leg 302 may be comprised of square tubing.

Figure 2:
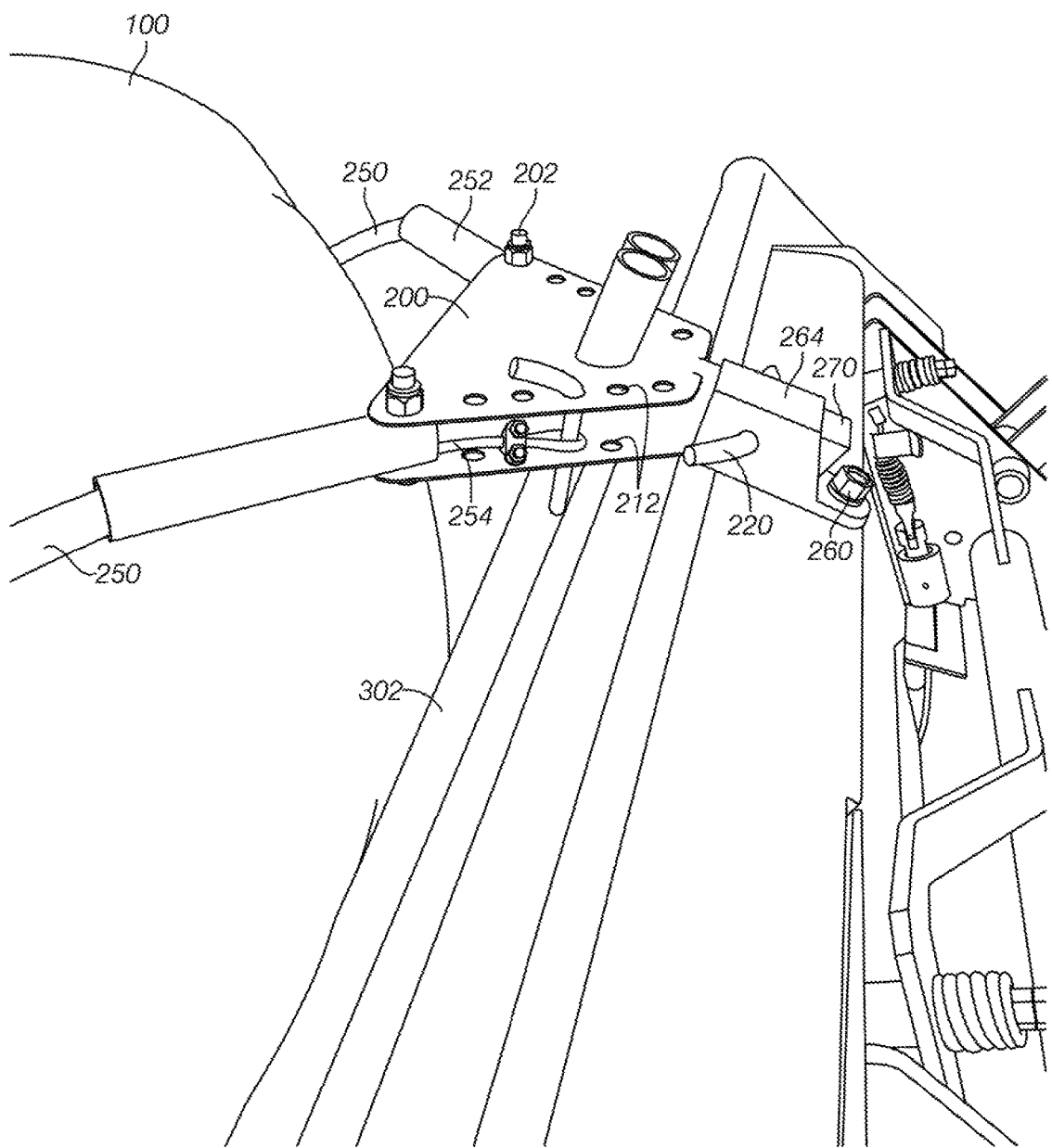
FIG. 2 is a perspective view of the head of the grabbing attachment of FIG. 1.

Turning now to FIG. 2, a perspective view of a first embodiment of an attachment head, attachment head 200, is shown. Attachment head 200 may be comprised of two triangular-shaped flat plates, the first flat plate being spaced above the second flat plate. Attachment head 200 may include a shaft 270 disposed between the two flat plates and extending rearward.

The shaft 270 may secure the attachment head 200 to the tractor bucket 400 via mounting bracket 264 which includes a sleeve configured to receive the shaft 270. The shaft 270 may slide inside the sleeve and be secured via pin 220. The mounting bracket 264 may be secured to the tractor bucket 400 via fastener 260.

The attachment head 200 may include a pair of pivots 202. The pivots 202 may secure guide arms 252 between the plates of the attachment head 200. The pivots 202 may allow the guide arms 252 to rotate in the same plane as the plates of the attachment head 200. The guide arms 252 may support the loop 250 and provide some shape to it.

Loop 250 may include an inner cable 254 and an outer housing. The outer housing may extend from the first pivot to the second pivot, thus forming a hoop. The inner cable 254 may be disposed within the outer housing. The outer housing may be comprised of a flexible material such as rubber, plastic, leather etc. The inner cable may be comprised of a material with high tensile strength such as metal wire, natural and/or synthetic rope etc.

A first end of the inner cable 254 may comprise a first small loop. The first small loop may be secured to the attachment head 200 via a first cable retention device 222. The first cable retention device 222 may be passed through a hole 212 in the upper plate of the attachment head 200, through the first loop, and through a corresponding hole 212 in the lower plate of the attachment head 200.

Similarly, a second end of the inner cable 254 may comprise a second small loop. The second small loop may be secured to the attachment head 200 via a second cable retention device. The second cable retention device may be passed through a hole 212 in the upper plate of the attachment head 200, through the first loop, and through a corresponding hole 212 in the lower plate of the attachment head 200.

In some embodiments, the attachment head 200 may comprise a first series of pairs of holes (one in the upper plate and a corresponding one in the lower plate) 212 disposed near a first edge of the attachment head 200. Additionally or alternatively, the attachment head 200 may comprise a second series of pairs of holes 212 disposed near a second edge of the attachment head 200. In this regard, the length of the loop 250 may be adjusted by moving one or both of the cable retention devices and corresponding small loops to a different pair of holes.

In operation, a large object, such as a round bale 100, may be grabbed via the attachment 20 by first lowering the loop 250 over the object, via the tractor bucket 400. Once the loop is in place around the bale 100, the tractor bucket 400 may be tilted back, causing the guard 304 to come into contact with the sidewall of the bale 100 and pulling the loop 250 taught against the bale 100, thereby ensnaring the bale 100. The tractor bucket 400 may then be raised, thereby picking up the bale 100. The bale 100 is thus held in place via friction on the housing of the loop 250.

To place the bale 100, the process is reversed. The tractor bucket 400 may be lowered until the bale 100 rests on the ground. Then the tractor bucket may be tilted forward, causing the guard 304 to pull back away and out of contact with the bale 100. The tractor bucket 300 may then be raised, raising the loop up and away from the bale 100.

Figure 3:
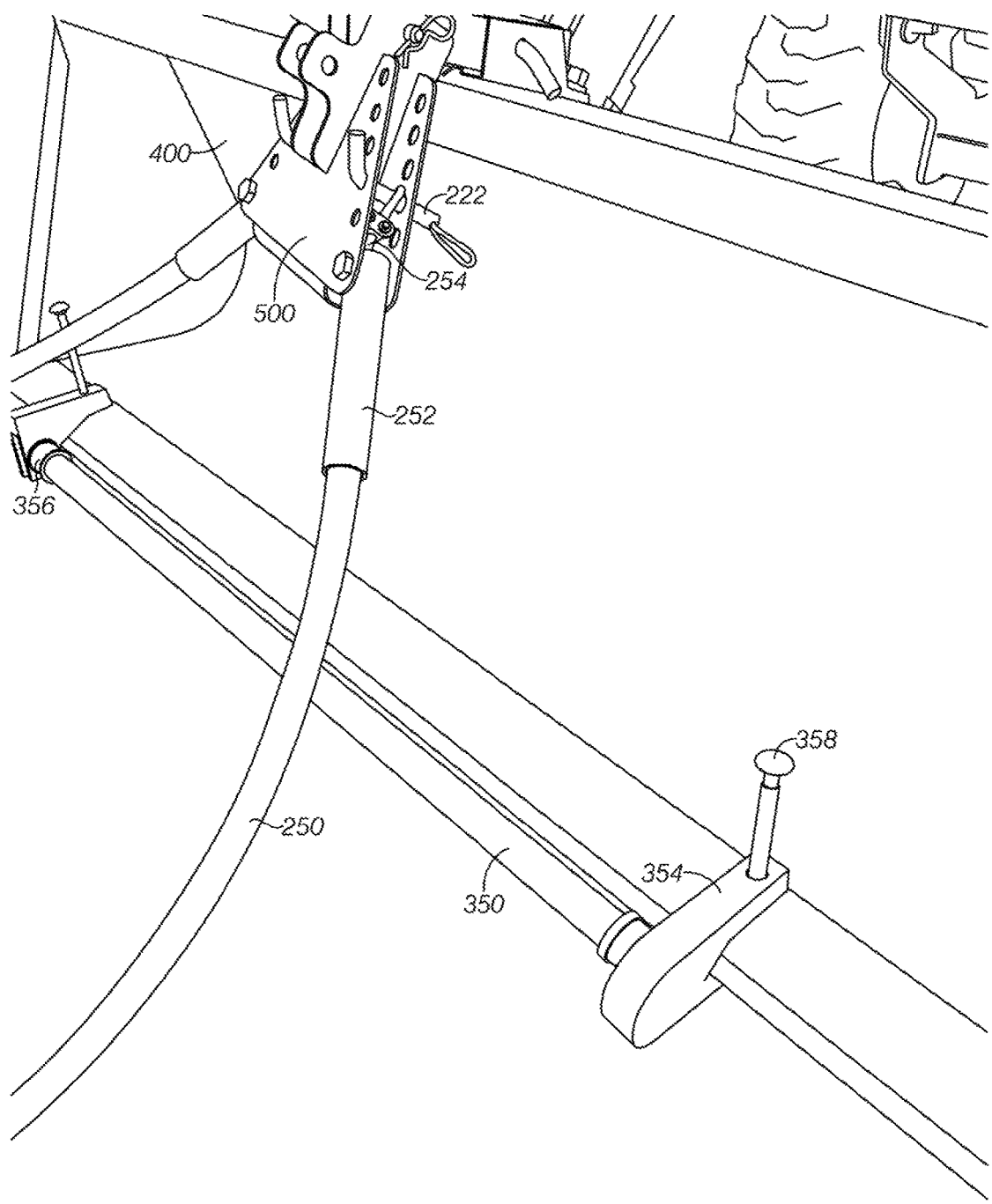
FIG. 3 is a perspective view of a second example of a grabbing attachment.
Figure 4:
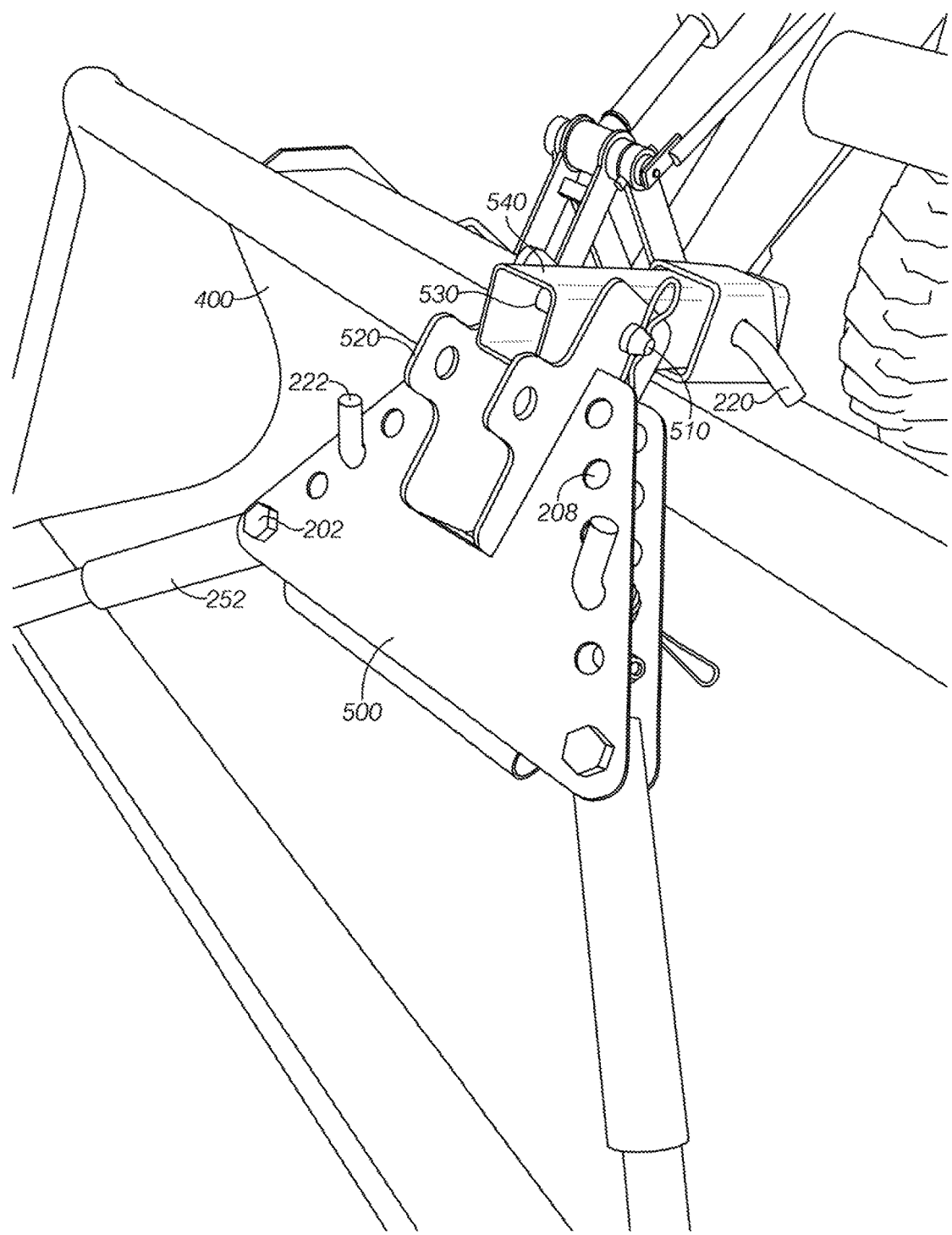
FIG. 4 is a perspective view of the head of the grabbing attachment of FIG. 3.

Turning attention to FIG. 3-4, a second example of a grabbing attachment, attachment 50, will now be described. Attachment 50 includes many similar or identical features to attachment 20. Thus, for the sake of brevity, each feature of attachment 50 will not be redundantly explained. Rather, key distinctions between attachment 50 and attachment 20 will be described in detail and the reader should reference the discussion above for features substantially similar between the two attachments.

As can be seen in FIG. 3, attachment 50 includes attachment head 500, loop 250, and guard 350. As can be seen, guard 350 is not connected to the attachment head 500. Unlike guard 304, guard 350 is a separate part from the rest of the attachment.

Guard 350 includes a clamp 354 on each end of the guard 350. Each clamp 350 may include a threaded fastener 358. The threaded fastener 358 may function to pinch the tractor bucket 400, thereby holding the guard 350 in place. The clamp 350 may be secured to the guard 350 via a retainer 356.

The guard 350 may be comprised, of metal. For example, guard 350 may be comprised of steel tubing. In one embodiment, guard 304 may be comprised of round tubing. For example, in the illustrated embodiment, guard 304 is comprised of a length of round tubing. In other embodiments, guard 304 may be comprised of square tubing.

As shown in FIG. 4, attachment 50 includes a shaft 540. Shaft 540 is attached at one end to the mounting bracket via mounting pin 220. The other end of shaft 540 is attached to attachment head 500 via pivot 510. Thus, attachment head 500 may pivot vertically. Attachment head 500 further includes tabs 520 having holes. The shaft 540 may also include corresponding holes 530. A pin (not shown) may be inserted through holes in the tabs 520 and through the holes 530 in the shaft 540. In this regard, the attachment head 500 may be locked and prevented from pivoting.

Figure 5:
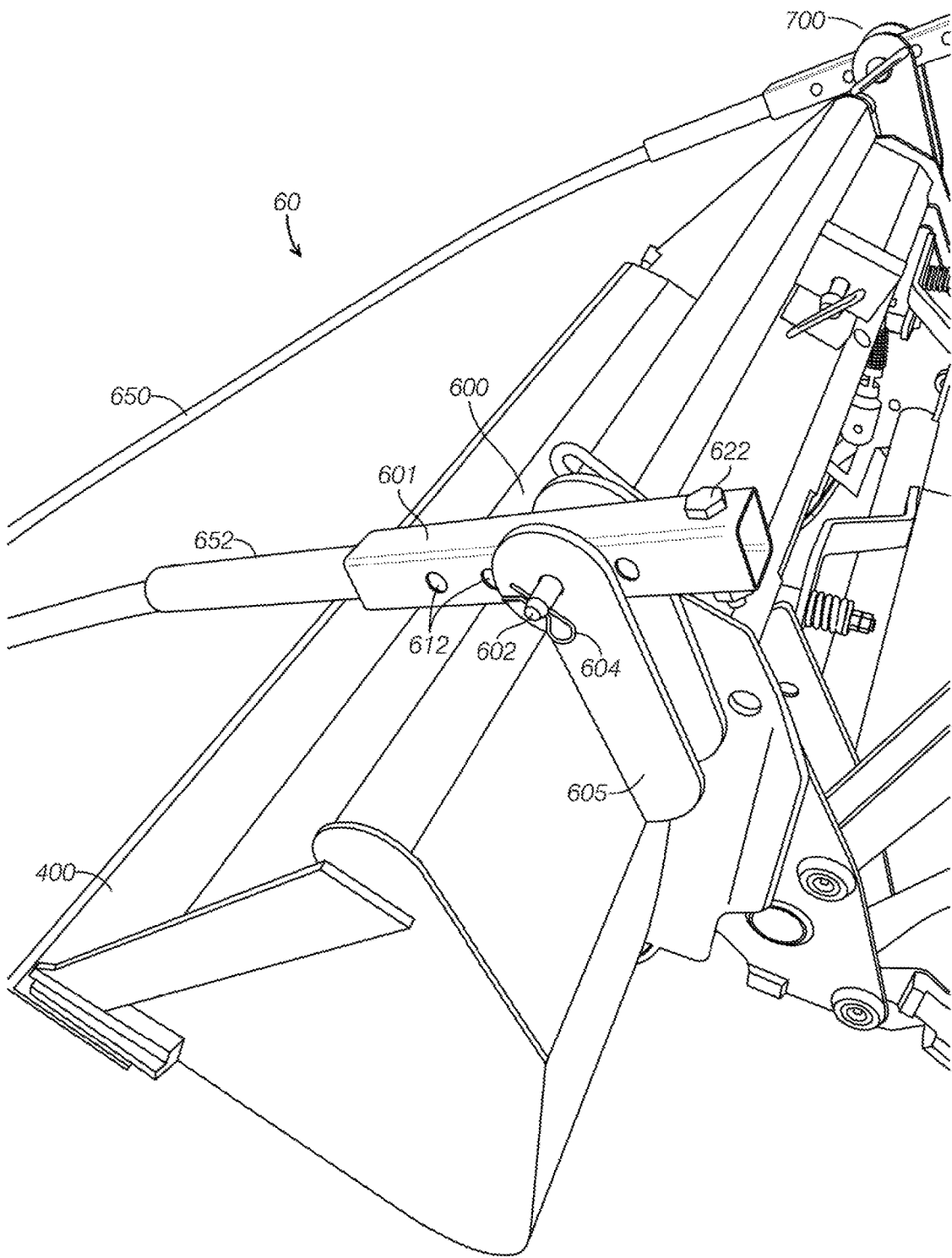
FIG. 5 is a perspective view of a third example of a grabbing attachment.
Figure 6:
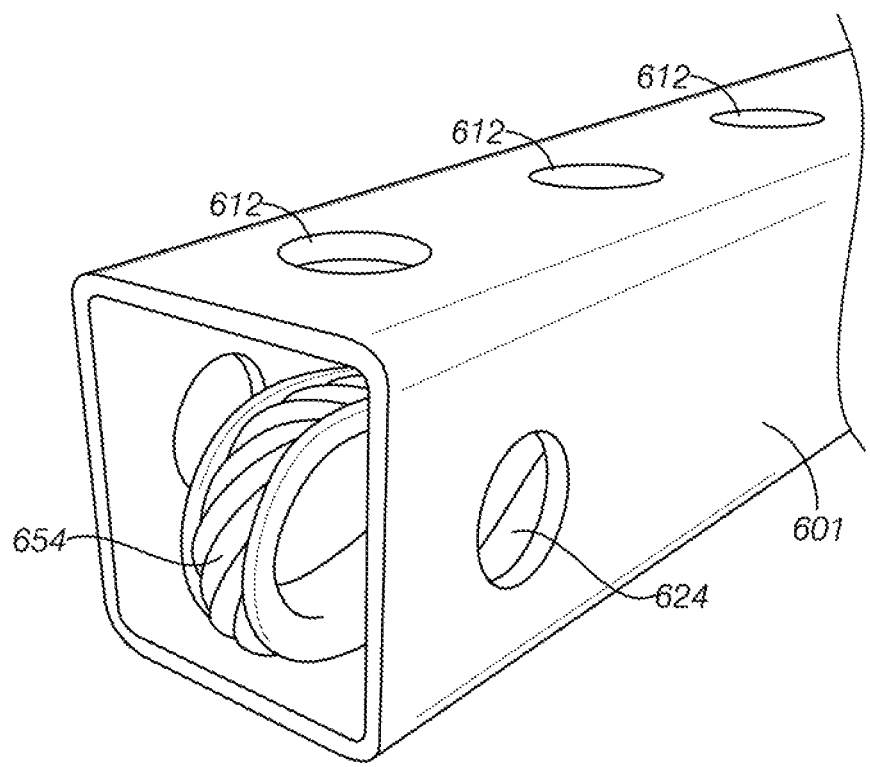
FIG. 6 is a perspective view of the end of the cable inside the shaft of the grabbing attachment of FIG. 5.
Figure 7:
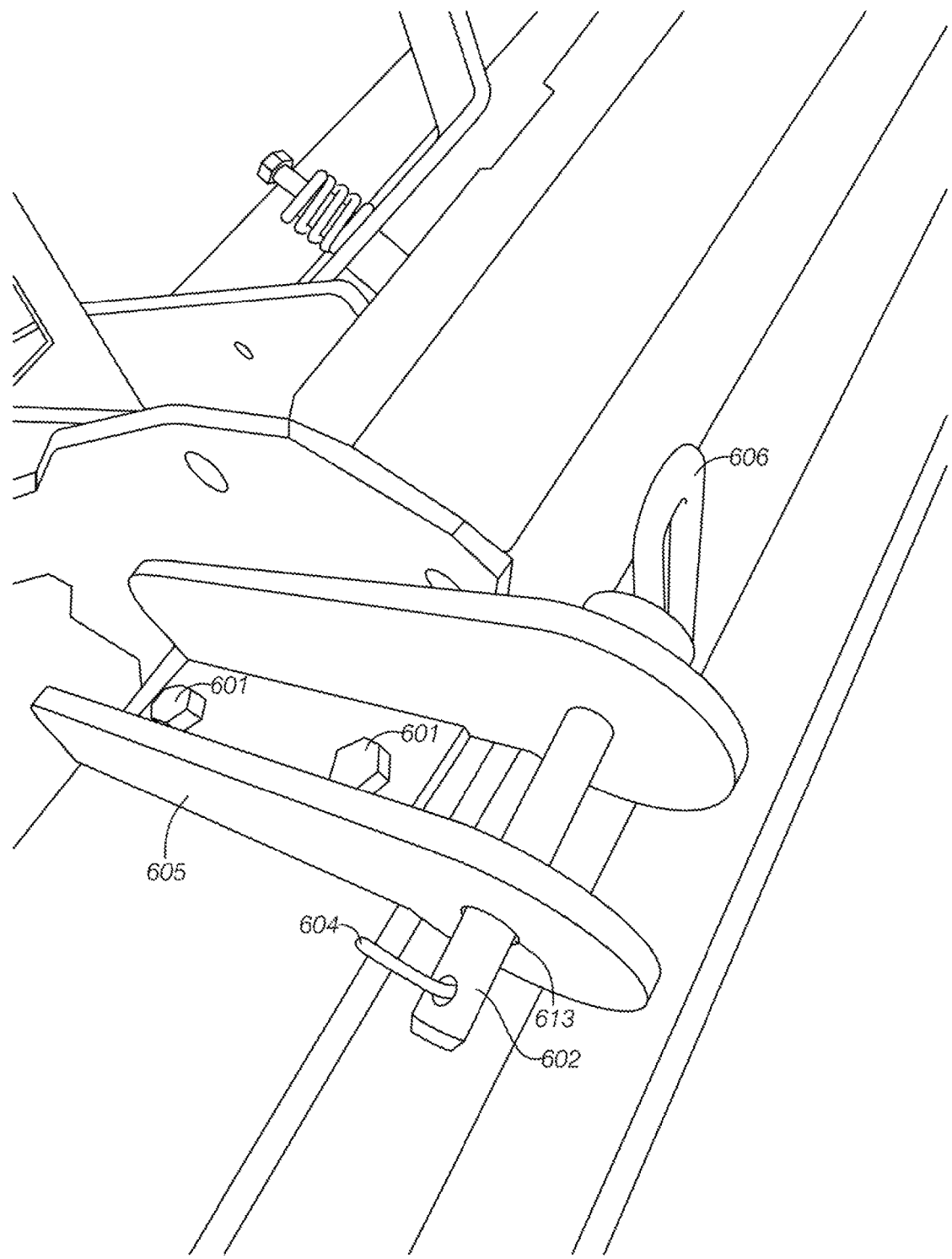
FIG. 7 is a perspective view of the first mounting bracket of the grabbing attachment of FIGS. 5-6.

Turning now to FIGS. 5-7, a third example of a grabbing attachment, attachment 60, will now be described. Attachment 60 includes many similar or identical features to attachments 20 and/or 50. Thus, for the sake of brevity, each feature of attachment 60 will not be redundantly explained. Rather, key distinctions between attachment 50 and attachments 20 and/or 50 will be described in detail, and the reader should reference the discussion above for features substantially similar between the two attachments.

As can be seen in FIG. 5, attachment 60 includes a first attachment head 600, a second attachment head 700, and a loop 650. The first attachment head 600 has a first mounting bracket 605 and a first guide arm 652. The first guide arm 652 is attached to the first mounting bracket 605 via a first pivot member 602. The first guide arm 652 includes a shaft 601. The second attachment head 700 may similarly have a second mounting bracket, second guide arm, second shaft and second pivot member. The second attachment 700 head may include any or all of the features of the first attachment head 600.

The first guide arm 652 may comprise a tubular member comprised of, for example, a heavy rubber. The shaft may comprise, for example, a square steel tube. The loop 650 may include an inner cable 654 and a cable sheath surrounding at least a portion of the cable 654. The Thus the guide arms may support the flexible cable 654 proximal the ends of the cable.

The first mounting bracket 605 may include a pair of corresponding holes 613 to receive the first pivot member 602. The shaft 601 of the guide arm 652 may include a plurality of corresponding pairs of holes 612. Each pair of holes may comprise a first hole penetrating though one wall of the shaft 601 and a second hole penetrating through an opposing wall of the shaft (not shown). The pivot member 602 may be inserted though the holes 613 of the mounting bracket and though a pair of the plurality of holes 612 of the guide arm. Thus a pivot in the first attachment head may be formed. The pivot may be configured to allow the guide arm 652 to rotate vertically.

The pivot member 602 may include a handle 606 and retaining pin 604. The retaining pin 604 may be removed to allow the pivot member 602 to be removed from the holes 613 in the side channel as well as the holes 612 of the first guide arm 652. Thus, the first guide arm 652 may be easily removed. The second guide arm may be similarly removed, thus allowing quick and easy removal of the loop 650 without tools. Alternatively, the length of loop 650 may be adjusted by removing the pivot member 602 from one pair of the plurality of holes 612 and placing it instead through another pair of the holes.

As can be seen in FIG. 6, the loop 650 may comprise an inner cable 654. The first end of the cable may have a small loop formed in it. The first end of the cable may be secured by inserting cable retention device 622 through a pair of holes 624 in the shaft 601 and though the small loop, thereby trapping the small loop.

As can be seen in FIG. 7, the first attachment bracket 605 is attached to the tractor bucket 400 via one or more fasteners 601, 602. In one embodiment, first attachment bracket 605 may comprise a channel having sidewalls and a base, the fasteners 601, 602 being located on the base of the channel.

Attachment 60 may be used in a similar manner as attachment 20 and/or 50. For example, a guard, such as guard 350, may be employed with attachment 60.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention, or a different invention and whether they are different, broader, narrower or equal in scope to the original claims, are to be considered within the subject matter of the inventions described herein.

The invention claimed is:

1. A tractor bucket attachment, comprising:
   a first attachment head including a first mounting bracket configured to secure the first attachment head to a tractor bucket, the tractor bucket having a front edge;
   a second attachment head including a second mounting bracket configured to secure the second attachment head to the tractor bucket;
   a loop of flexible cable having a first end and a second end, the first end being attached to the first attachment head and the second end being attached to the second attachment head, wherein the loop of flexible cable is configured to ensnare a bale against the front edge of the tractor bucket;
   a first guide arm attached to the first attachment head via a first pivot, wherein:
      the first guide arm is configured to support the flexible cable proximal the first end; and
      the first guide arm is configured to rotate vertically about the first pivot; and a second guide arm attached to the second attachment head via a second pivot, wherein:
      the second guide arm is configured to support the flexible cable proximal the second end; and
      the second guide arm is configured to rotate vertically about the second pivot.

2. The tractor bucket attachment of claim 1, wherein the first guide arm or the second guide arm comprise a tubular member, the flexible cable being routed through the tubular member.

3. The tractor bucket attachment of claim 1, wherein the first pivot comprises a pivot member, a pair of opposing holes in the first mounting bracket, and a pair of corresponding holes in the first guide arm.

4. The tractor bucket attachment of claim 3, wherein the pair of corresponding holes in the first guide arm is one of a plurality of pairs of holes in the first guide arm, the plurality of pairs of holes being configured to facilitate length adjustment of the loop of flexible cable.

5. The tractor bucket attachment of claim 1, comprising a cable sheath surrounding at least a portion of the flexible cable.

6. The tractor bucket attachment of claim 1, the first mounting bracket includes a channel configured to be attached to the tractor bucket.

7. The tractor bucket attachment of claim 1, comprising a guard configured to protect the bale from the front edge of the tractor bucket.

8. A tractor bucket attachment, comprising:
   a first attachment head including a first mounting bracket configured to secure the first attachment head to a tractor bucket, the tractor bucket having a front edge;
   a second attachment head including a second mounting bracket configured to secure the second attachment head to the tractor bucket;
   a loop of flexible cable having a first end and a second end, the first end being attached to the first attachment head and the second end being attached to the second attachment head, wherein the loop of flexible cable is configured to ensnare a bale against the front edge of the tractor bucket;
   a first guide arm attached to the first attachment head via a first pivot, wherein:
      the first guide arm is configured to support the flexible cable proximal the first end; and
      the first guide arm is configured to rotate vertically about the first pivot; and
   a second guide arm attached to the second attachment head via a second pivot, wherein:
      the second guide arm is configured to support the flexible cable proximal the second end; and
      the second guide arm is configured to rotate vertically about the second pivot.

* * * * *